United States Patent [19]

Hayashi

[11] Patent Number: 5,353,329
[45] Date of Patent: Oct. 4, 1994

[54] FACSIMILE APPARATUS AND ALARM SYSTEM WITH CORDLESS TELEPHONE SET

[75] Inventor: Motohiko Hayashi, Yamatokoriyama, Japan

[73] Assignee: Sharp Kabushiki Kaisha, Osaka, Japan

[21] Appl. No.: 50,735

[22] Filed: Apr. 21, 1993

Related U.S. Application Data

[63] Continuation of Ser. No. 684,864, Apr. 15, 1991, abandoned.

[30] Foreign Application Priority Data

Apr. 18, 1990 [JP] Japan .................................. 2-104192
Apr. 18, 1990 [JP] Japan .................................. 2-104193

[51] Int. Cl.$^5$ .......................................... H04M 11/00
[52] U.S. Cl. .......................................... 379/58; 379/61; 379/100
[58] Field of Search ................... 379/58, 61, 100, 159, 379/160, 208, 215; 358/400

[56] References Cited

U.S. PATENT DOCUMENTS

| | | | |
|---|---|---|---|
| 4,650,931 | 3/1987 | Tsukada et al. | 379/61 |
| 4,706,274 | 11/1987 | Baker et al. | |
| 4,847,891 | 7/1989 | Kotani | |
| 4,870,678 | 9/1989 | Adachi | |
| 4,881,259 | 11/1989 | Scordato | |
| 4,882,746 | 11/1989 | Shimada | 379/61 |
| 4,908,851 | 3/1990 | Kotani et al. | 379/100 |
| 4,977,589 | 12/1990 | Johnson et al. | 379/63 |
| 5,027,385 | 6/1991 | Nakagawa et al. | 379/100 |

FOREIGN PATENT DOCUMENTS

| | | |
|---|---|---|
| 0310001 | 4/1989 | European Pat. Off. |
| 3705636 | 9/1987 | Fed. Rep. of Germany |
| 3644228 | 7/1988 | Fed. Rep. of Germany |
| 0165157 | 8/1985 | Japan |
| 0157551 | 6/1988 | Japan |
| 8902390 | 9/1989 | Netherlands |
| 224910A | 5/1990 | United Kingdom |

OTHER PUBLICATIONS

Japanese laid-open publication 56-123133, Sep. 1981.
Japanese laid-open publication 60-242738, Dec. 1985.
Japanese laid-open publication 62-95060, May 1987.

*Primary Examiner*—Curtis Kuntz
*Assistant Examiner*—Dwayne D. Bost

[57] ABSTRACT

A facsimile apparatus incorporating a cordless telephone set includes a base unit transmitting and receiving a signal to and from a remote unit with a radio signal, and a facsimile communication device. During voice communication with the remote unit via a telephone line, an alarm is issued to the user when the voice communication continues for more than a predetermined time period. An alarm is also given to the user of internal line voice communication when there is a telephone call from an external line during voice communication between the base unit and the remote unit. Therefore, the reception of a reception signal to the facsimile apparatus is not inhibited because an alarm is issued when voice communication continues for more than a predetermined time period and when there is a telephone call from an external line during internal line voice communication.

8 Claims, 5 Drawing Sheets

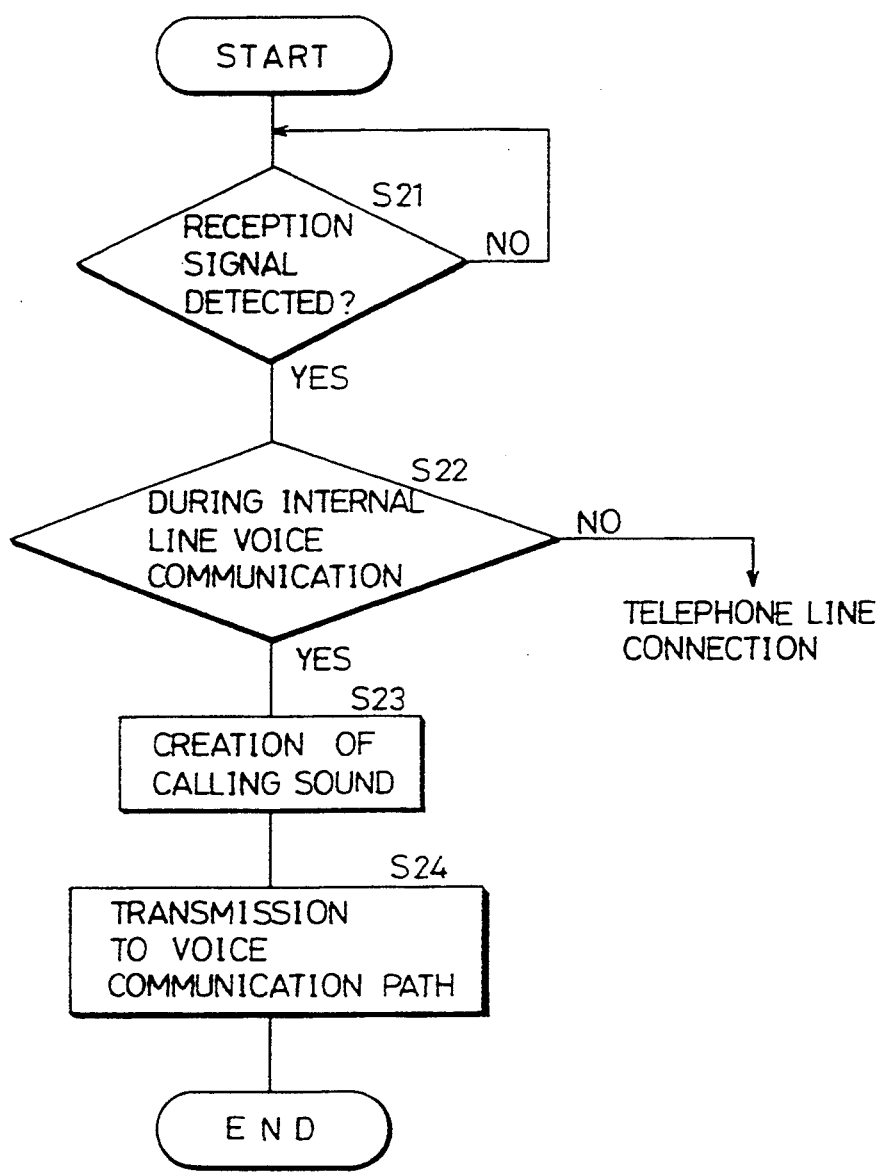

FACSIMILE APPARATUS AND ALARM SYSTEM WITH CORDLESS TELEPHONE SET

This application is a continuation, of application Ser. No. 07/684,864 filed on Apr. 15, 1991, now abandoned.

BACKGROUND OF THE INVENTION

1. Field of The Invention

The present invention relates to facsimile apparatus comprising cordless telephone sets, and more particularly, to a facsimile apparatus comprising a cordless telephone set that can perform the facsimile function sufficiently.

2. Description of The Background Art

Facsimile apparatus incorporating telephone sets have been provided to efficiently utilize one telephone line. Some facsimile apparatus incorporate cordless telephone sets. In such a case, it is possible to carry out voice communication using a remote unit of the cordless telephone set even from a place remote from the facsimile apparatus main body. Such a facsimile apparatus with a cordless telephone set has the base unit of the cordless telephone set built in the facsimile apparatus main body, whereby a person can talk using the remote unit via the base unit by an external line.

In the above mentioned facsimile apparatus incorporating a cordless telephone set, the facsimile apparatus and the cordless telephone set commonly share one telephone line. Accordingly, transmission and reception of facsimile communication with the facsimile apparatus was not possible during voice communication through the cordless telephone set with the external line. A facsimile apparatus incorporating a cordless telephone set is generally placed at the corner of a room due to the noise it makes during operation. The usage of a remote unit allows talking under a more quiet agreeable environment away from the main body of the facsimile apparatus, which attributed to increase the time period of voice communication with the external line using the cordless telephone set. There was a problem that the function of the facsimile apparatus could not be exhibited sufficiently even though facsimile communication function is equipped.

The facsimile apparatus incorporating a cordless telephone set can carry out not only facsimile transmission/reception and talking through external line with the telephone set, but also voice communication between the incorporated telephones, i.e., internal line voice communication.

In a facsimile apparatus incorporating a cordless telephone set, the telephone line is connected to neither the telephone set nor the facsimile apparatus during internal line voice communication, i.e. during talking carried out between the remote unit of the cordless telephone set and the telephone set connected to the main body of the facsimile apparatus. This means that the facsimile apparatus is under an open state. Even if the facsimile apparatus detects a reception signal from an exchanger, the person talking through the internal line is not aware of a facsimile transmission being made because no device is implemented to notify the user of the telephone. There was a disadvantage that an important telephone call or a facsimile transmission from an external line that is of higher priority would be missed.

SUMMARY OF THE INVENTION

An object of the present invention is to allow a facsimile apparatus to exhibit its function sufficiently in a facsimile apparatus incorporating a telephone set.

Another object of the present invention is to issue an alarm to the user when talking by using a telephone set continues too long a time period in a facsimile apparatus incorporating a telephone set.

A further object of the present invention is to notify the user talking through the internal line the detection of a reception signal from an external line in a facsimile apparatus comprising a telephone set with internal line voice communication function.

The above objects of the present invention are achieved with a facsimile apparatus comprising the following elements. A facsimile apparatus according to the present invention includes a first communicating device for transmitting and receiving an aural signal via a telephone line, a second communicating device for transmitting and receiving an image signal via the telephone line, a communication time determining device for making determination whether the communication time period by the first communication device exceeds a predetermined time or not, and an alarm device for generating an alarm when the communication time determining device makes determination that the predetermined time has elapsed. An alarm is generated when the communication time with the first communication device exceeds a predetermined time period, so that a lengthy telephone call of the user is prevented. As a result, the facsimile apparatus can exhibits its function sufficiently.

According to another aspect of the present invention, a facsimile apparatus includes a first communicating device for transmitting and receiving an aural signal via a telephone line, wherein the first communicating device further includes an internal line voice communication device allowing talking without the telephone line, a second communicating device for transmitting and receiving an image signal through the telephone line, a reception signal detecting device for detecting a reception signal from the telephone line, a determining device for making determination whether the internal line voice communication device is available or not when the reception signal detecting device detects a reception signal, and an alarm device for generating an alarm when the determining device makes determination of internal line voice communication.

An alarm is generated when a reception signal from the telephone line is received during internal line voice communication so that the reception signal from the telephone line is not neglected or missed. As a result, the facsimile apparatus can exhibit its function sufficiently.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a flow chart for explaining the operation of a facsimile apparatus according to a second embodiment of the present invention.

DESCRIPTION OF THE PREFERRED EMBODIMENTS

Figure 1:
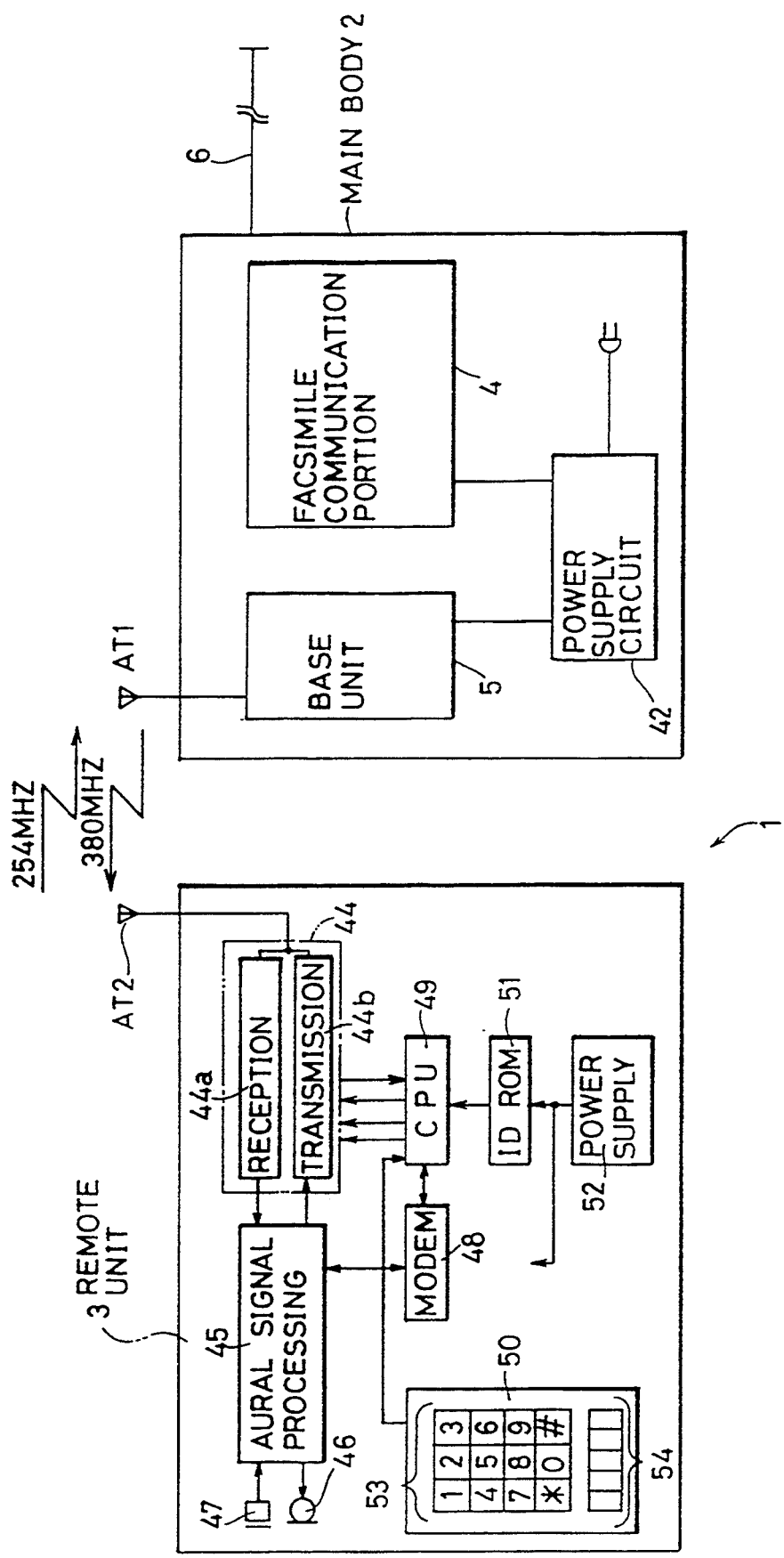
FIG. 1 is a block diagram schematically showing a facsimile apparatus comprising a cordless telephone set according to the present invention.

Referring to FIG. 1, a facsimile apparatus 1 having a cordless telephone set according to the present invention comprises a main body 2 connected to a telephone line 6, and a remote unit 3 connected to main body 2 by radio communication. Main body 2 comprises a facsimile communication portion 4, a base unit 5 connected to remote unit 3 by radio communication, and a power supply circuit 42 for providing power supply to facsimile communication portion 4 and base unit 5.

Figure 2:
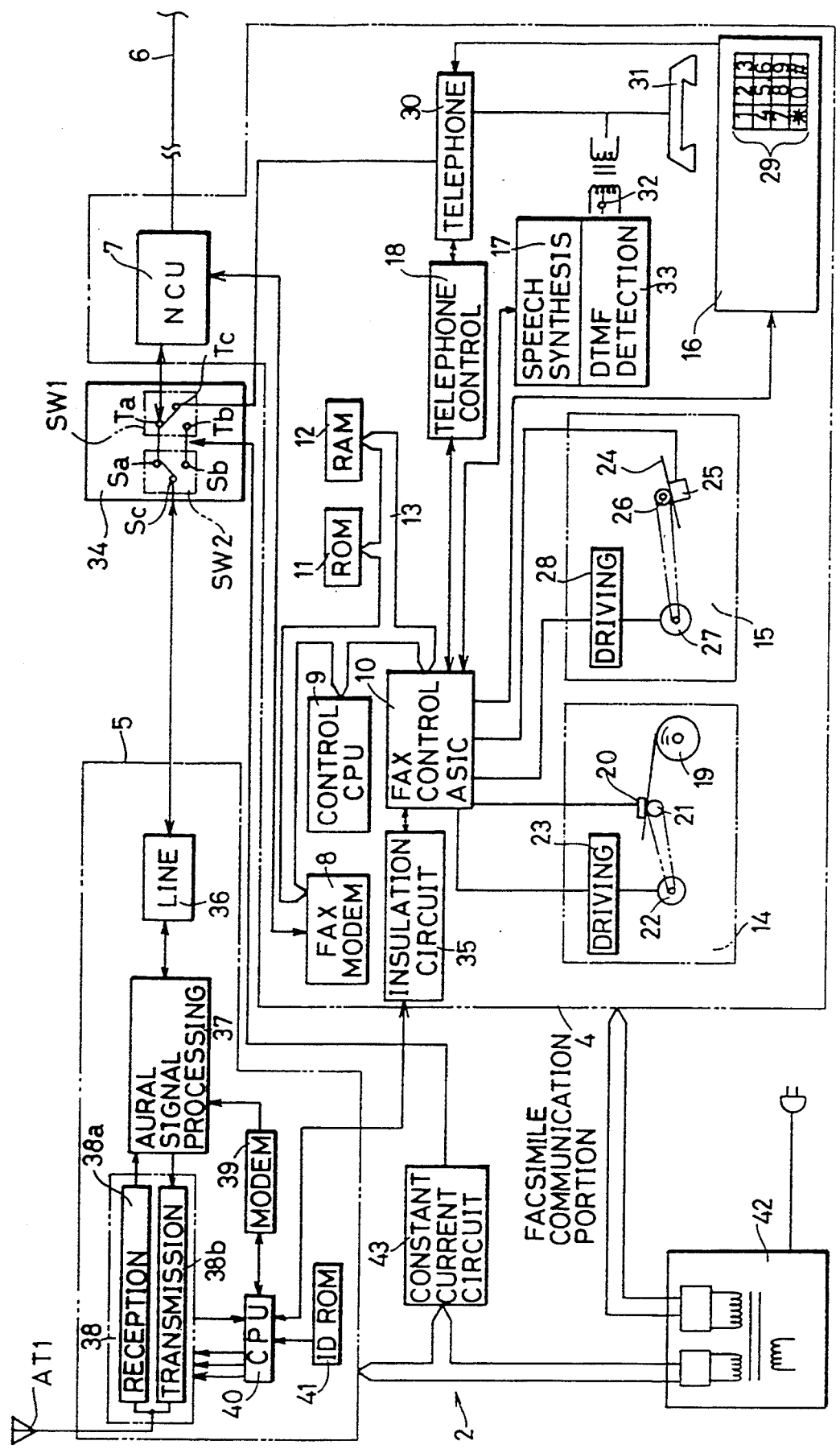
FIG. 2 is a block diagram showing in detail a base unit and a main body constituted by a facsimile commu

The structure and the operation of main body 2 according to the present invention will be explained hereinafter with reference to FIG. 2. Referring to FIG. 2, telephone line 6 is connected to an NCU (Network Control Unit) of facsimile communication portion 4. NCU 7 comprises a CML (Connect Modem to Line) relay for a terminating signal detecting circuit (not shown) to connect a FAX modem 8 to telephone line 6. NCU 7 supplies the signal received via telephone line 6 to FAX modem 8. FAX modem 8, a control CPU 9, a FAX control ASIC 10 controlling the entire facsimile apparatus, a ROM 11 and a RAM 12 are interconnected by a data bus 13. Control CPU 9 identifies the signal from FAX modem 8 to control FAX control ASIC 10. FAX control ASIC 10 controls a recording device 14, a reading device 15, an operation panel 16, a speech synthesis circuit 17, and a telephone control portion 18 according to the output of control CPU 9. Programs required for various control are stored in ROM 11. Data used at the time of various processing operation are stored in RAM 12. A work area is also set in RAM.

Recording device 14 records the received image data on a record sheet 19. A record head 20 is pressed against a roller 21 with record sheet 19 therebetween. Record sheet 19 is recorded according to a recording signal from FAX control ASIC 10. Roller 21 is rotated by a motor 22, whereby record sheet 19 is forwarded in synchronism with the recording speed of record head 20. A driving circuit 23 controls motor 22 according to a control signal from FAX control ASIC 10.

Reading device 15 optically reads the original image of an original 24. Original 24 is pressed against a reading sensor 25 such as a CCD (Charge Coupled Device) by a roller 26. Roller 26 is rotated by driving a motor 27, whereby original 24 is forwarded to be read by reading sensor 25. A driving circuit 28 controls motor 27 according to a control signal from FAX control ASIC 10.

Operation panel 16 comprises a ten-key 29. A PB (Push Button) signal generated by operating ten-key 29 is supplied to a telephone portion 30. Telephone portion 30 carries out the calling operation according to the PB signal from operation panel 16. Telephone portion 30 is provided with a handset 31 for talking. A speech synthesis circuit 17 and a DTMF detector 33 are connected between telephone portion 30 and handset 31 via a transformer 32. DTMF (Dual Tone Multi Frequency) is a signal of a combination of particular frequencies indicating the numeric values of a telephone number, the priority rank, or the end of a signal.

Various aural messages synthesized by speech synthesis circuit 17 are provided to an external line or a remote unit 3 from the speaker of handset 31 and through telephone portion 30. DTMF detector 33 detects a DP signal or a PB signal received by telephone portion 30 to provide that signal to FAX control ASIC 10. Telephone portion 30 is controlled by a telephone control portion 18.

FAX control ASIC 10 carries out transmission/reception of a signal to or from base unit 5 via an insulation circuit 35 such as a photocoupler.

An internal/external line switcher 34 carries out the switching of an internal line and an external line among base unit 5, telephone line 6 and telephone portion 30. Internal/external line switcher 34 comprises switches SW1 and SW2.

Terminal Ta of switch SW1 is connected to terminal Sa of switch SW2. Terminal Tb of switch SW1 is connected to terminal Sb of switch SW2. Switch SW1 has terminal Ta connected to NCU 7, and terminal Tc connected to telephone portion 30. Base unit 5 is connected to terminal Sc of switch SW2. Base unit 5 and telephone portion 30 are capable of communication with the external line by connecting terminal Ta to terminal Tc in switch SW1, and terminal Sa to terminal Sc in switch SW2. Telephone portion 30 is capable of communication with the external line by connecting terminal Tb to Tc in switch SW1. Internal line communication is capable between base unit 5 and telephone portion 30 by connecting terminal Tb to terminal Tc in switch SW1 and terminal Sb to terminal Sc in switch SW2.

The structure of base unit 5 will be explained hereinafter. A line circuit 36 is connected to terminal Sc of internal/external line switcher 34. Line circuit 36 is provided with a speech network for controlling the transmission and reception of an aural signal through the handset, and a dialer to generate a DT signal or a PB signal for calling the telephone set of the called side. An aural signal processing circuit 37 is connected to line circuit 36. Aural signal processing circuit 37 comprises a limiter for controlling the amplitude value of the voltage and a compounder (a compressor circuit and an expander circuit) for compressing/expanding an aural signal. The processing of aural signals received via line circuit 36 and transmission/reception circuit 38 are carried out in aural signal processing circuit 37. The received control signal is supplied to a CPU 40 via a modem 39.

CPU 40 controls base unit 5 and remote unit 3 according to a control signal provided via a modem 39, a control signal provided from transmission/reception circuit 38, and a control signal provided from FAX control ASIC 10 via insulation circuit 35.

An IDROM 41 is stored with ID (identification) codes for each cordless telephone set specified by the Minister of Posts and Telecommunications. At the time of connection of radio line, an ID code is transmitted to remote unit 3, whereby the ID code is verified so that signals are not sent to other remote units.

Transmission/reception circuit 38 comprises a receiving circuit 38a and a transmitting circuit 38b. Receiving circuit 38a demodulates a reception signal received by antenna AT1 to provide that signal to aural signal processing circuit 37 and CPU 40. Transmitting circuit 38b modulates/demodulates a signal provided from aural signal processing circuit 37 and CPU 40 to transmit a signal to a remote unit from antenna AT1 at a frequency of, for example, 380 MHz (refer to FIG. 1).

Main body 2 and base unit 5 of facsimile apparatus 1 are provided with power from power supply circuit 42. Power from power supply circuit 42 is also supplied to a constant current circuit 43. Constant current circuit 43 supplies the direct constant current to internal/external line switcher 34 to provide direct current to the communication path for internal line talking.

The structure of remote unit 3 will be explained hereinafter with reference to FIG. 1. The reception signal received by an antenna AT2 is supplied to a receiving circuit 44a of transmission/reception circuit 44 and is demodulated. The aural signal is supplied to aural signal processing circuit 45. The control signal is supplied to a CPU 49. A transmitting circuit 44b modulates the aural signal and the control signal from aural signal processing circuit 45 and CPU 49 to send the signal from antenna AT2 to base unit 5 at, for example, 254 MHz. CPU 49 controls remote unit 3 according to the control signal from receiving circuit 44a, the control signal supplied via modem 48, and key pulses from operation panel 50.

ID codes for each cordless telephone set specified by the Minister of Posts and Telecommunications are stored in an IDROM 51. At the time of connection of radio line, an ID code is transmitted to base unit 5 to verify the ID code.

Aural signal processing circuit 45 processes an aural signal from transmission/reception circuit 44 and a control signal from CPU 49 via modem 48 to provide these signals from a telephone transmitter 46. Aural signal processing circuit 45 processes the aural signal from a telephone receiver 47 to provide that signal to transmitting circuit 44b of transmission/reception circuit 44. Operation panel 50 comprises a ten-key 53 and a mode specifying key 54. Each key has a separate frequency signal which is supplied to CPU 49. Remote unit 3 is power supplied by a power supply 52.

The detail structure and operation of the cordless telephone is described in U.S. Pat. No. 4,881,259. Therefore, the same is hereby incorporated by reference into the present application.

Figure 3:
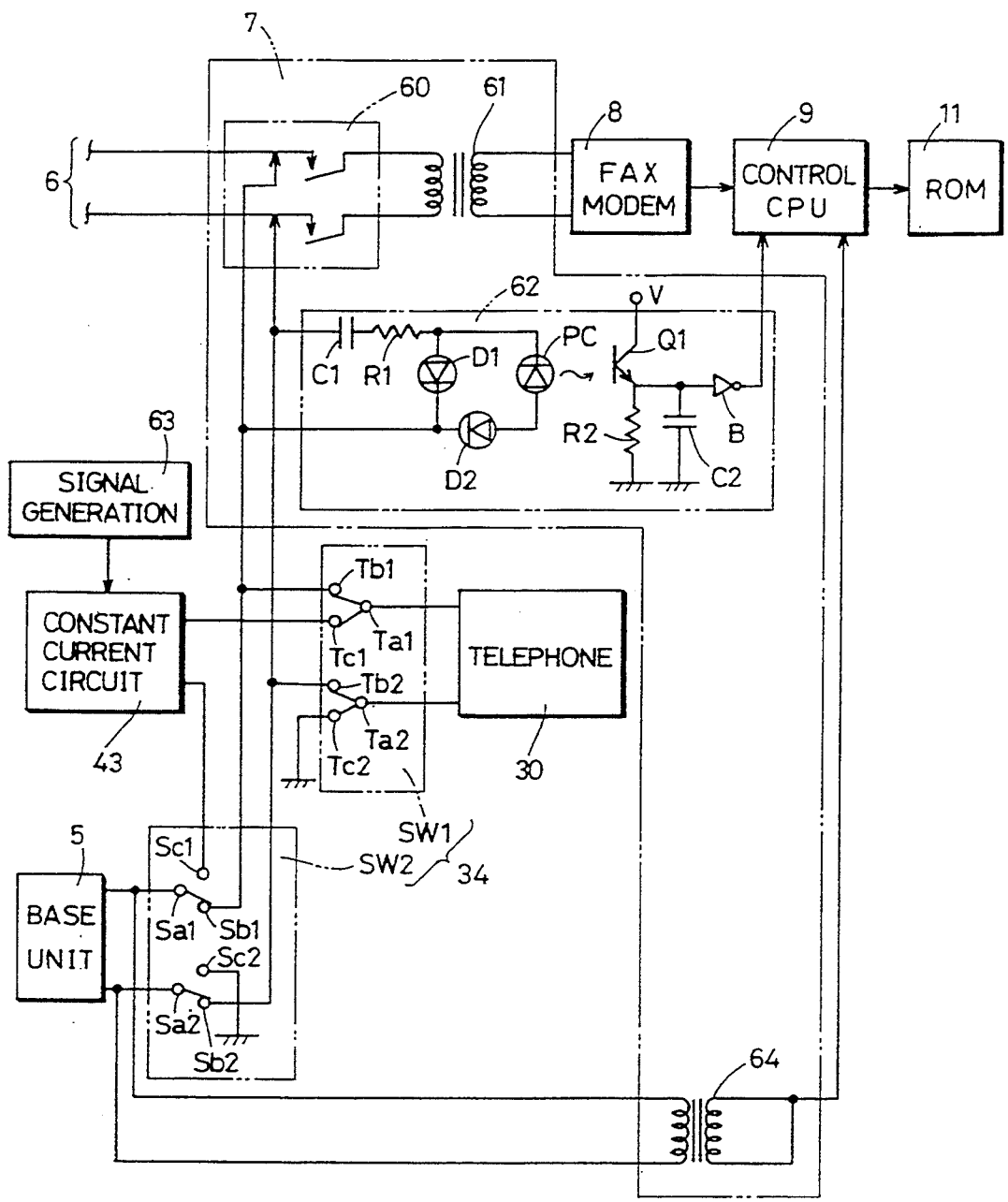
- FIG. 3 is a circuit diagram of a structure relating to a NCU and an internal/external lines switcher.

Referring to FIG. 3, a NCU 7 comprises a CML relay 60, transformers 61 and 64, and a reception signal detecting circuit 62. Telephone line 6 is connected to a FAX modem 8 via CML relay 60 and transformer 61, and to reception signal detecting circuit 62.

Reception signal detecting circuit 62 comprises a condenser C1, a resistor R1, diodes D1 and D2, and a photocoupler PC. When a reception signal from an exchanger not shown enters reception signal detecting circuit 62, photocoupler PC emits light which is directed to the base of a NPN type phototransistor Q1. Phototransistor Q1 has the connector applied with voltage V, and the emitter grounded via a resistor R2. An inverting circuit B is connected to the emitter via condenser C2. The output of inverting circuit B is applied to CPU 9.

Therefore, the output of inverting circuit B is normally at a high level. The incident of light from photocoupler PC to the base of phototransistor Q1 turns on phototransistor Q1, whereby the output of inverting circuit B attains a low level. This results in the acknowledgement of receiving a reception signal by CPU 9.

In response to the reception signal, CPU 9 transmits a response signal to the caller, whereby a CNG signal is transmitted from the caller in case of facsimile communication. The detection of a CNG signal by CPU 9 causes the connection of telephone line 6 with FAX modem 8 by CML relay 60 to receive signals in the facsimile apparatus. When a normal voice communication is requested, CPU 9 emits the ringing tone of telephone portion 30 or remote unit 3.

Telephone line 6 is connected to telephone portion 30 of facsimile communication portion 4 via switch SW1, and to base unit 5 via switch SW2. When talking through an external line, switch SW1 has terminals Ta1 and Ta2 connected to terminals Tb1 and Tb2, respectively, and switch SW2 has terminals Sa1 and Sa2 connected to terminals Sb1 and Sb2, respectively. This allows talking through an external line with telephone portion 30 or remote unit 3.

In the case of internal line voice communication, i.e. talking between remote unit 3 and telephone portion 30 of facsimile communication portion 4, switch SW1 has terminals Ta1 and Ta2 connected to terminals Tc1 and Tc2, respectively, and switch SW2 has terminals Sa1 and Sa2 connected to terminals Sc1 and Sc2, respectively. As a result, base unit 5 and telephone portion 30 are connected via constant current circuit 43. The voice communication path is supplied with DC constant current from constant current circuit 43, whereby talking is carried out between telephone portion 30 and remote unit 3.

Signal generating circuit 63 is connected to constant current circuit 43. Signal generating circuit 63 generates a signal predetermined in advance, for example, an alarm bleep. This alarm signal is transmitted to the voice communication path via constant current circuit 43.

A transformer 64 is connected between base unit 5 and control CPU 9. CPU 9 creates an alarm bleep signal according to the program stored in ROM 11 via transformer 64. This alarm bleep signal is sent to the voice communication path. The alarm bleep is a signal having a characteristic of the output interval of the alarm bleep becoming shorter according to the elapse of time.

The operation of the facsimile apparatus according to the present invention will be explained hereinafter.

1 The First Embodiment

Figure 4:
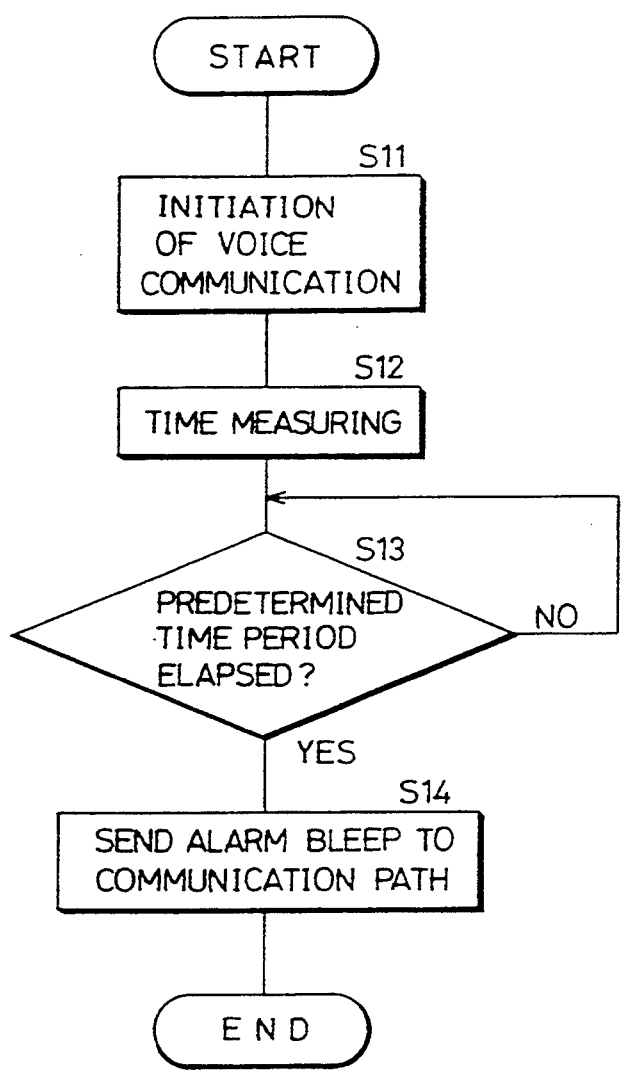
FIG. 4 is a flow chart for explaining the operation of a facsimile apparatus according to a first embodiment of the present invention.

The first embodiment of the present invention will be explained with reference to FIG. 4. On initiation of voice communication by remote unit 3 with the external line at step S11, CPU 9 commences the operation of measuring a certain time period predetermined in advance, for example ten minutes, at step S12. In the voice communication by remote unit 3 with the external line, the time measuring operation may be initiated from the time point when remote unit 3 performs the calling operation, or from the time point when remote unit 3 receives voice communication from the calling station. The determination of whether remote unit 3 is available or not is carried out by control CPU 9 detecting a control signal provided from CPU 40 of base unit 5 via insulation circuit 35 and FAX control ASIC 10.

When the expiration of a predetermined time period, for example ten minutes, is detected at step S13, control CPU 9 creates an alarm bleep according to the program stored in ROM 11, whereby this alarm is transmitted to the voice communication path via transformer 64. As a result, an alarm bleep is provided from telephone transmitter 46 of remote unit 3 so that the user of remote unit 3 can recognize that the voice communication time period has exceeded ten minutes.

According to the first embodiment, an alarm bleep is transmitted to the voice communication path when the voice communication by remote unit 3 exceeds a relatively long time period to prompt the termination of voice communication by the user of remote unit 3. Thus, facsimile apparatus 1 is capable of performing its function sufficiently.

Although the voice communication time period between remote unit 3 and the external line is measured in the above described embodiment, the time period of internal line voice communication between remote unit 3 and telephone portion 30 may also be measured. In this case, the alarm bleep is created in signal generating circuit 63 to be transmitted to the voice communication path.

2 The Second Embodiment

The operation of the second embodiment of the present invention will be explained with reference to FIG. 5. When a reception signal from an exchanger is detected by reception signal detecting circuit 62 at step S21, control. CPU 9 makes determination whether internal line voice communication is carried out between remote unit 3 and telephone portion 30 from the operational states of CPU 40 of base unit 5 and telephone control portion 18 of facsimile apparatus 4 at step S22.

When determination is made that internal line voice communication is carried out, the program proceeds to step S23. An alarm bleep is created to notify the user of the internal line that there is a telephone call from an external line. This calling sound is created by signal generating circuit 63. At step S24, the alarm bleep created by signal generating circuit 63 is transmitted to the voice communication path from constant current circuit 43. This alarm bleep is provided from the telephone transmitter 46 of remote unit 3 and handset 31 of telephone portion 30. The users of the internal line are informed of a telephone call from an external line. Although the creation of the alarm bleep at step S23 is performed by signal generating circuit 63, the alarm bleep may be created according to a program stored in advance within ROM 11 as in the first embodiment, and transmitted to the voice communication path from transformer 61.

If an internal line voice communication is not, detected in step S22, the normal telephone line connecting operation is carried out.

Remote unit 3 or telephone portion 35 may be connected to telephone line 6 by manually switching internal/external line switcher 34 upon the operator catching the alarm bleep. Alternatively, either remote unit 3 or telephone portion 30 may be connected to telephone line 6 automatically by control CPU 9.

According to the second embodiment, an alarm bleep is transmitted to the voice communication path when there is a telephone call from an external line during internal line voice communication between remote unit 3 and telephone portion 30. Because the alarm bleep is provided from telephone transmitter 46 of remote unit 3 and handset 31 of telephone portion 30, the user of the internal line telephone can be made aware of a telephone call from an external line.

As a result, remote unit 3 or telephone portion 30 is manually or automatically connected to telephone line 6 so that the facsimile apparatus can exhibit its facsimile communication function sufficiently.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile apparatus comprising:

first communication means for transmitting and receiving an aural signal via a telephone line, said first communication means further including an internal line voice communication device capable of voice communication without said telephone line, second communication means for transmitting and receiving an image signal via said telephone line, calling signal detecting means for detecting a calling signal to at least one of said first and second communication means from said telephone line, determining means for determining whether or not said internal line voice communication device is available when said calling signal detecting means detects said calling signal, alarm means for generating an alarm when said determining means determines that said internal line voice communication device is not available, connection means for automatically connecting said at least one of the first and second communication means, for which a calling signal was detected to said telephone line when said alarm means fails to generate an alarm; and switching means for allowing a user to manually switch from an internal line to the external line when said alarm means generates an alarm.

2. A facsimile apparatus comprising:

first communication means for transmitting and receiving an aural signal via telephone line, said first communication means further including an internal line voice communication device for voice communication via electromagnetic, the internal line voice communication device being selectively connectable to the telephone line yet operable without being connected to said telephone line;

second communication means for transmitting and receiving an image signal via said telephone line;

calling signal detecting means for detecting a calling signal to at least one of said first and second communication means from said telephone line;

determining means for determining whether or not said internal line voice communication device is being used by a user when said calling signal detecting means detects said calling signal;

alarm means for generating an alarm at the internal line voice communication device, when said determining means determines that said internal line voice communication device is being used by the user; and connecting means for automatically connecting said telephone line to said second communication means when said determining means determines that said internal line voice communication device is not being used by the user.

3. A facsimile apparatus comprising:

first communication means for transmitting and receiving an aural signal via telephone line, said first communication means further including an internal line voice communication device for voice communication via electromagnetic waves, the internal voice communication being selectively connectable to the telephone line yet operable without being connected to said telephone line;

second communication means for transmitting and receiving an image signal via said telephone line;

calling signal detecting means for detecting a calling signal to at least one of said first and second communication means from said telephone line;

determining means for determining whether or not said internal line voice communication device is being used by a user when said calling signal detecting means detects said calling signal;

alarm means for generating an alarm at the internal line voice communication device, when said determining means determines that said internal line voice communication device is being used by the user; and connecting means for automatically connecting said telephone line to said first communication means when said determining means determines that said internal line voice communication device is not being used by the user.

4. A facsimile apparatus comprising:

first communication means for transmitting and receiving an aural signal via a telephone line, said first communication means further including an internal line voice communication device capable of voice communication without said telephone line, second communication means for transmitting and receiving an image signal via said telephone line, calling signal detecting means for detecting a calling signal to at least one of said first and second communication means from said telephone line, determining means for determining whether or not said internal line voice communication device is available when said calling signal detecting means detects said calling signal, alarm means for generating an alarm, to a user of the internal line voice communication device, when said determining means determines that said internal line voice communication device is not available, so that the user knows that an external line, for the one of the first and second communication means, for which a calling signal was detected, is available, connecting means for automatically connecting said telephone line to said one of the first and second communication means, for which the calling signal was detected, when said alarm means fails to generate an alarm; and switch means, for allowing a user to manually switch from an internal line to the external line when said alarm means generates an alarm.

5. The facsimile apparatus according to claim 3, further comprising connecting means for automatically connecting said at least one of said first and second communication means, for which a calling signal was detected, to said telephone line when said alarm means generates an alarm.

6. The facsimile apparatus according to claim 4, further comprising connecting means for manually connecting the at least one of the said first and second communication means,. for which a calling signal was detected, to said telephone line when said alarm means generates an alarm.

7. The facsimile apparatus according to claim 4, wherein said internal line communication means includes a handset and a telephone transmitter.

8. The facsimile apparatus according to claim 7, wherein said alarm is provided from said telephone transmitter.

* * * * *